Patented June 8, 1926.

1,588,194

UNITED STATES PATENT OFFICE.

ANTHONY SCHREIBER, OF EAST AURORA, NEW YORK.

NASAL AND THROAT DOUCHE PREPARATION.

No Drawing.    Application filed May 21, 1924.    Serial No. 714,844.

The invention relates to that class of compounds that are composed of one or more ingredients which if it were possible to apply singly to the membranous surfaces that frequently become infected inside the nasal passages or mucous membranes of the throat, would have a marked beneficial effect, but the physical nature of these same ingredients, besides being unattractive in appearance, would in wrong proportions be impracticable to apply and principally for this reason would be inefficient in action.

It is the object of this invention to make up a compound having undoubted medicinal value if compounded of certain ingredients, which experimentation has proved to be of much value medicinally, and will be clear in appearance and will be of such a nature that there will be no inconvenience in the applying to the affected surfaces. By using such a combination there will be obtained the full beneficial effect due to a spreading property of this compound when compounded within the limits of proper proportions and the full beneficial effect of practically a thorough contact due to a complete covering over, making the necessary intimate contact with the infected surfaces assured.

I have found that corn oil applied to the surfaces of the nasal passages alone has a noticeable effect in relieving distress due to crust formations and scabs in these passages. Especially is this so when compounded with alcohol in the proportion 95 parts of corn oil added to alcohol, which need not be anhydrous but in its content would be equal to 5 parts absolute alcohol. Compounded with proper care in these proportions, the liquid becomes an oily spray when applied. Alcohol and oils usually do not mix, but compounded in the herein described proportions and well shaken in a vessel, the constituents rarely, if ever resolve themselves into separate bodies. This characteristic in a compound of an oil and alcohol is unusual.

I have found that if the alcohol is of almost absolute purity, this proportion of corn oil to alcohol is usually clear. This clearness enhances its selling value.

When these ingredients are compounded in these proportions and are then applied to the nasal membranes, there is a noticeable tendency to reduce the viscosity or surface tension of the nasal discharge or exudation and allow the curative effect of the spray to extend over the entire area of the diseased mucous membrane. The nasal secretion of high surface tension tends to cover as little area as possible and is usually repellent to a medical application unless this surface tension is lower.

Corn oil when applied alone is beneficial, but if the alcohol is added the ease of applying adds much to its efficiency as a curative. Especially noticeable is the beneficial action when this compound is applied to the nasal passages when distress is caused by the diseased condition known as atropic rhinitis and fetid ozena.

Corn oil and alcohol in right proportions in this preparation cause the hypertrophied tissues to return to their normal healthy condition. This proportion of corn oil to alcohol has a curative effect which is unique in that it removes the foul smelling crusts and stimulates the tissues to return to a healthy condition, I have found by experiment.

What I claim is as follows:

A medicinal compound adapted to be used as an application on the membranous surfaces of the nose which consists of purified corn oil into which has been incorporated five percent by volume of practically anhydrous alcohol.

ANTHONY SCHREIBER.